Feb. 4, 1958 J. F. JOY 2,822,159
SHAFT OR TUNNEL BORING APPARATUS
Filed June 30, 1952 8 Sheets-Sheet 5
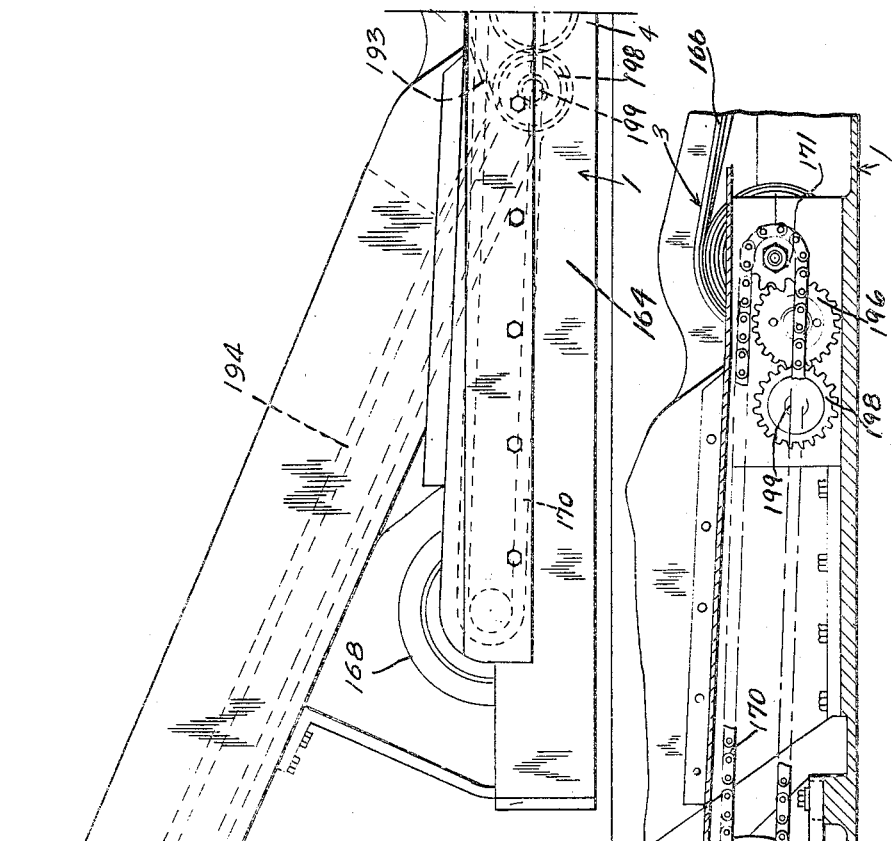
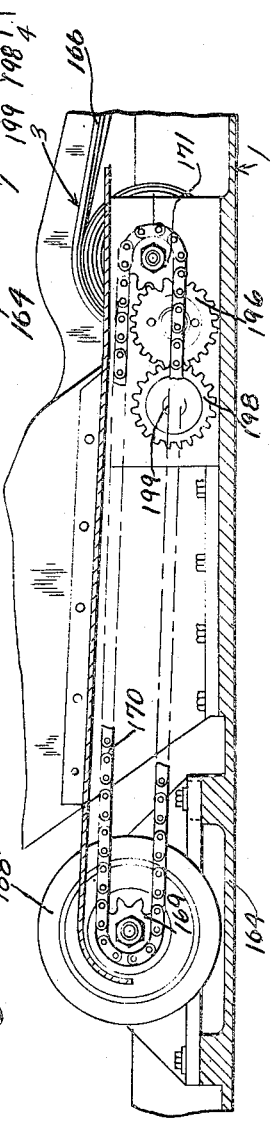
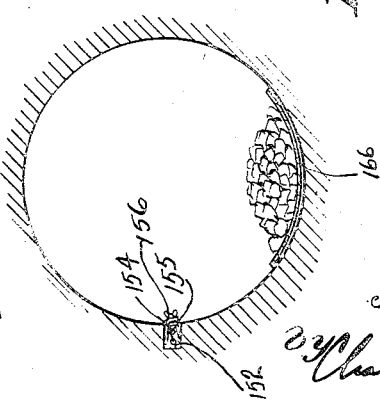
Inventor:
Joseph F. Joy.

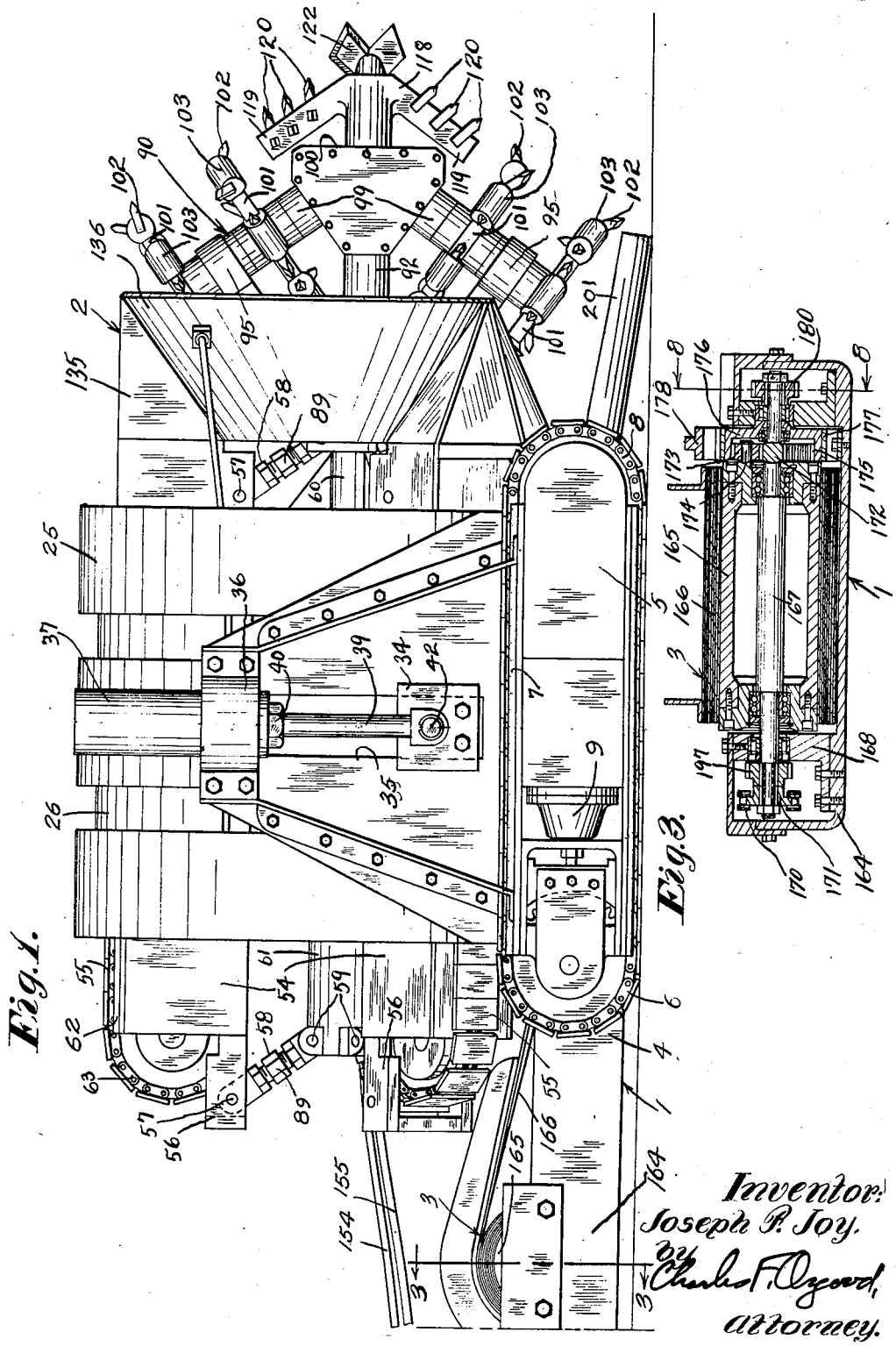

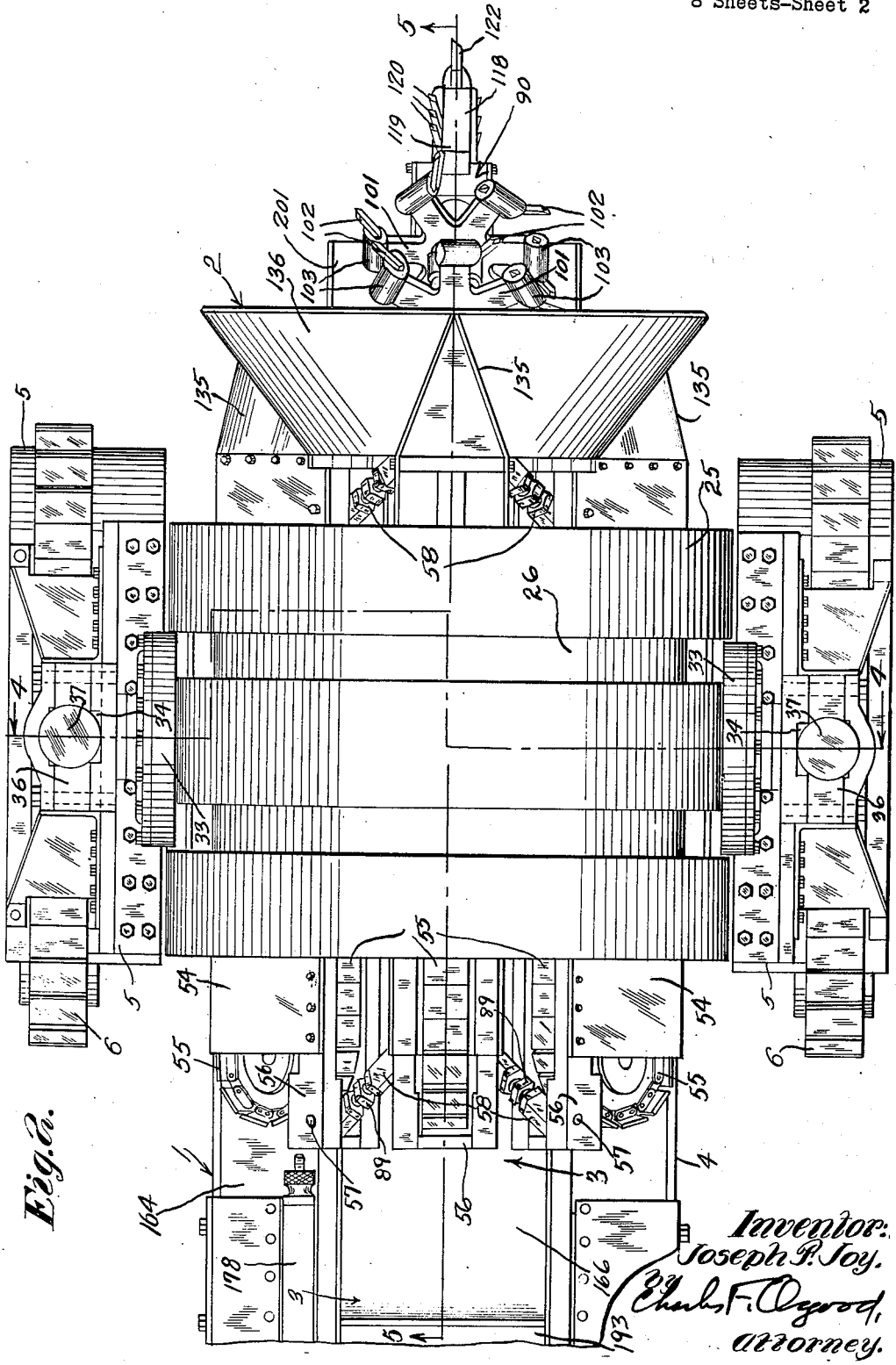

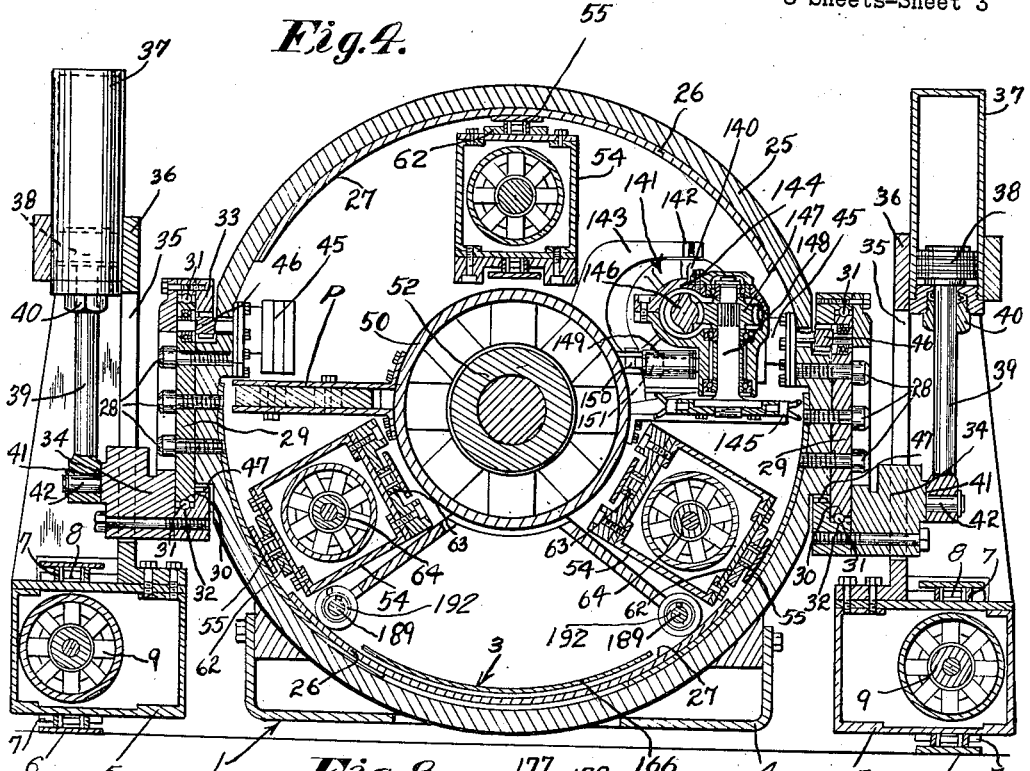

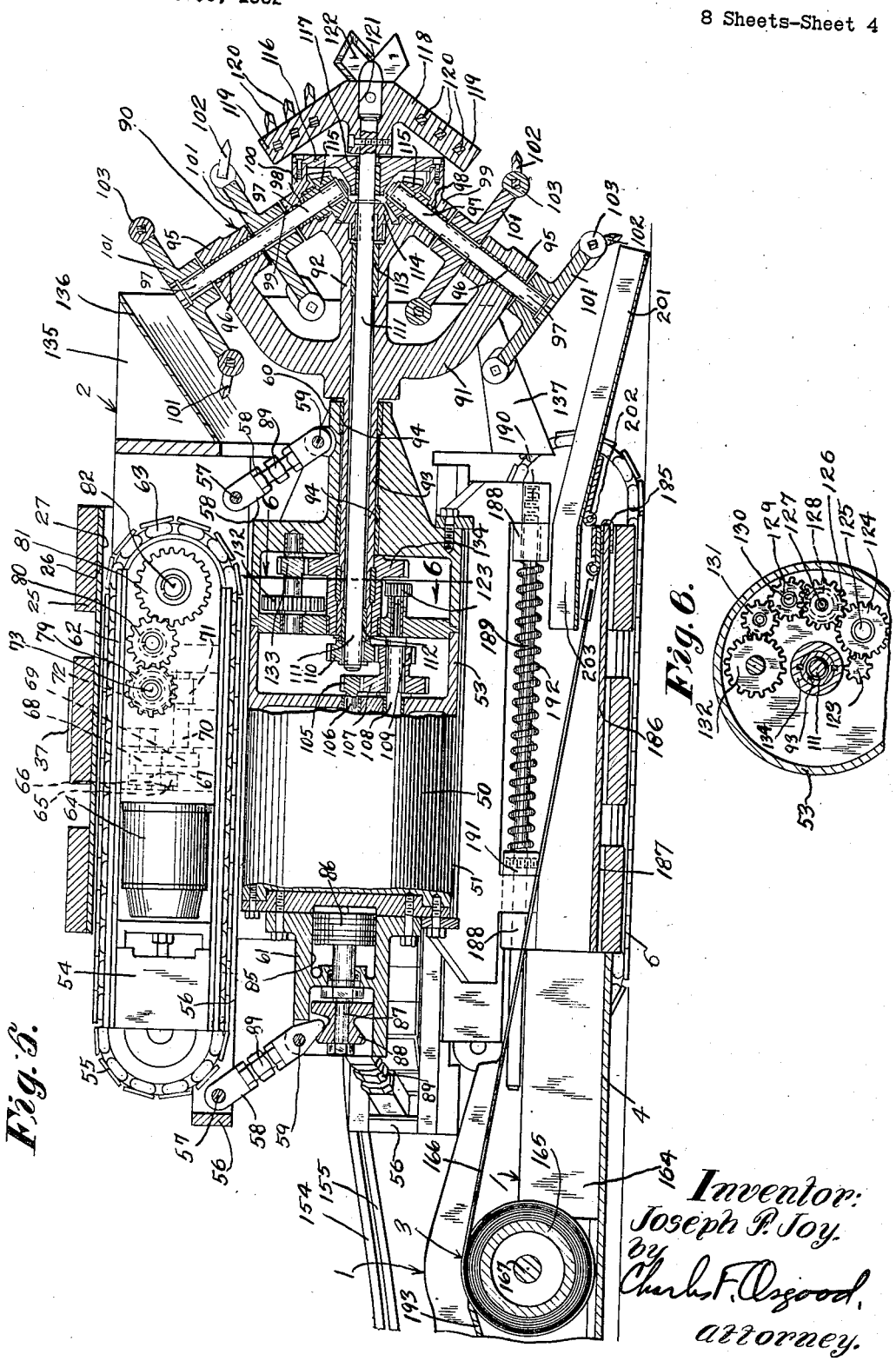

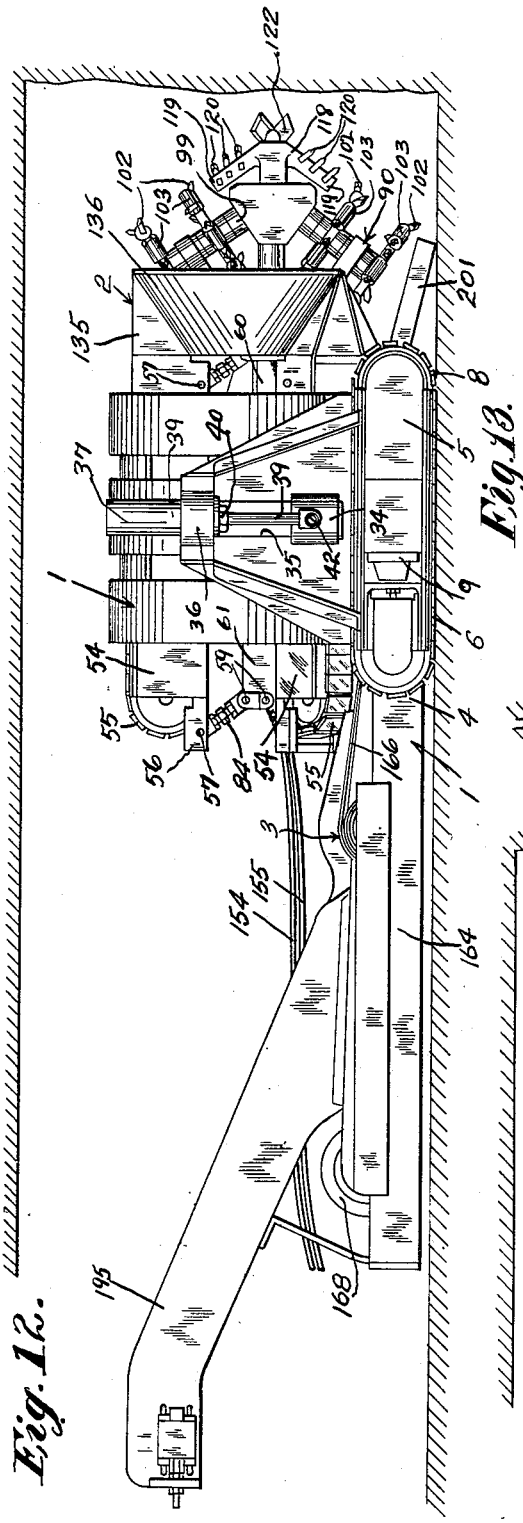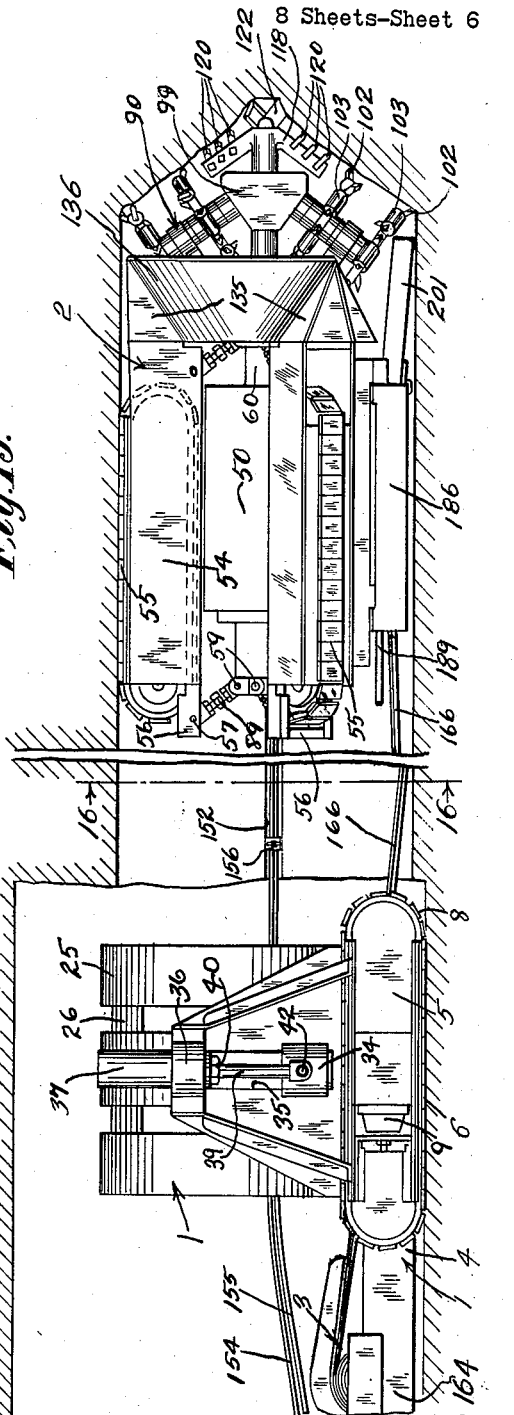

Feb. 4, 1958     J. F. JOY     2,822,159
SHAFT OR TUNNEL BORING APPARATUS
Filed June 30, 1952     8 Sheets-Sheet 7
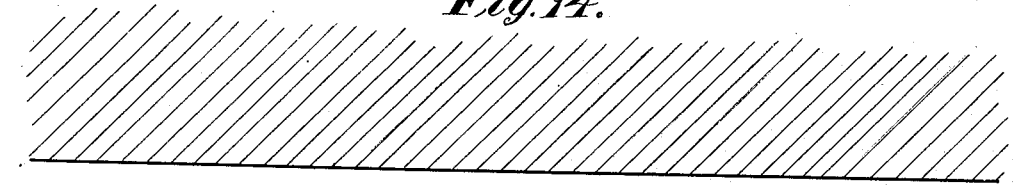
*Fig. 14.*
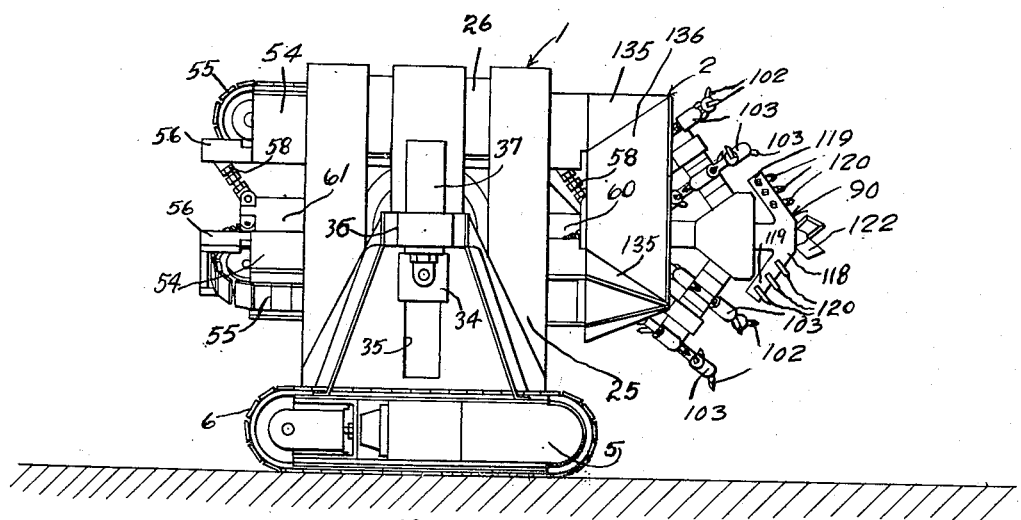
*Fig. 15.*
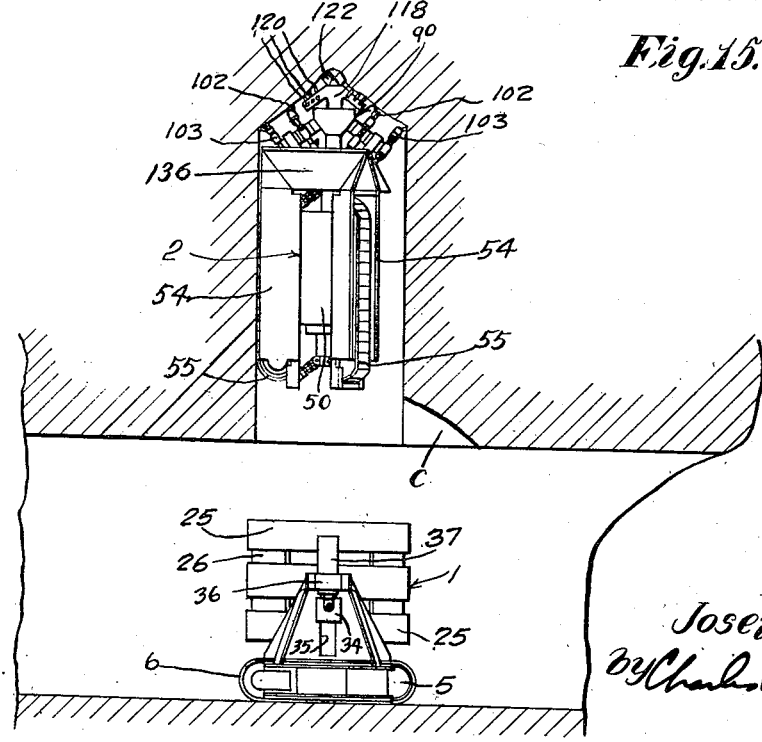
Inventor:
Joseph F. Joy.
by Charles F. Osgood,
attorney.

Feb. 4, 1958

J. F. JOY 2,822,159

SHAFT OR TUNNEL BORING APPARATUS

Filed June 30, 1952

Inventor:
Joseph F. Joy.
by Charles F. Osgood,
attorney.

United States Patent Office 2,822,159
Patented Feb. 4, 1958

2,822,159

SHAFT OR TUNNEL BORING APPARATUS

Joseph F. Joy, Franklin, Pa., assignor to Joy Manufacturing Company, Pittsburgh, Pa., a corporation of Pennsylvania Application June 30, 1952, Serial No. 296,324

38 Claims. (Cl. 262—7)

This invention relates to a mining apparatus and more particularly to a boring machine of the type known as a "bore miner" for forming bores in an earth formation such as a coal seam of an underground coal mine. While the present invention resides in a machine particularly designed for boring substantially horizontal holes, vertical bores and bores at any desired angle inclined between the horizontal and vertical may be formed if desired.

The improved bore forming apparatus, from a broad aspect, may comprise a rotary boring mechanism of a novel design for forming a bore in an earth formation, and having improved supporting and directing means, and improved feeding means engageable with the bore-walls for feeding the rotary boring mechanism as boring progresses.

From a more specific aspect the improved shaft or tunnel boring apparatus may comprise a body having propelling devices and provided with a rotary front cutting or boring head for boring a hole in the mine vein or other earth formation and the body of the machine is designed to enter the bore-hole with the propelling devices engaging the hole-walls for feeding the machine in the hole as the hole is extended and for retracting the machine from the hole. A self-propelled carriage or truck is provided for transporting the boring machine from place to place about the mine or tunnel and for providing guiding means for the boring machine during launching thereof from the carriage during its initial penetration of the mine vein or other earth formation. After the bore-hole is sufficiently deepened so that the machine completely leaves the carriage and is contained entirely within the borehole, the propelling and feeding devices of the machine engage the hole-walls and thus serve adequately to support, guide and propel the machine within the bore. In a preferred embodiment the carriage may have its launching mechanism adjustable into different angular positions so that the boring machine may be launched into the earth formation either horizontally or vertically or in any other intermediate angular position. As the rotary boring head revolves to form the bore-hole in mine vein or earth formation, the cuttings created thereby are directed rearwardly within the machine and a conveying means may be associated with the machine for receiving the cuttings and for conveying them rearwardly from the bore-hole. The propelling means for the boring machine may comprise endless crawler treads which may be held firmly in engagement with the walls of the bore and toggle connections may be provided between the machine body and the tread devices so that the latter may be expanded into firm contact with the bore-walls, and these toggle devices may be so designed that the rearward reaction forces created by the head during the boring operation, particularly during boring of a vertical shaft, tends to cause the toggle connections to urge the treads outwardly firmly into contact with the bore-walls. In order to alter the course of the machine during the boring operation, the toggle connections may be adjusted to effect tilting of the machine frame and boring head with respect to the tread devices. The boring head may be so designed not only to revolve on its own axis, but also to embody rotary cutters which also revolve on their own axes independently of head-rotation so that the earth formation such as coal or other mineral may be cut away and rapidly disintegrated as the machine is advanced. A mechanism may be provided on the machine for the cutting of a slot in the wall of the bore-hole near to the horizontal center and the machine may be keyed into this slot to insure against undesired turning of the entire machine in the hole so that the machine as it travels in the hole is maintained in an upright position necessary for its proper operation. The slot thus provided also serves as a recess for the accommodation of the electric power conductor cables, water hose lines or other conductors which are laid in the slot as the machine advances and which move from the slot as the machine is retracted. The machine is designed to form shafts or tunnels, but is especially adapted to use in the high speed production of coal in an underground coal mine. The machine may operate in accordance with the modified longwall system disclosed and claimed in my application, Serial No. 296,323, filed of even date herewith.

It is an object of the present invention to provide an improved mining apparatus. Another object is to provide an improved shaft or tunnel boring apparatus having novel features of construction whereby bores may be rapidly and effectively formed in a mine vein or other earth formation. Another object is to provide an improved mining mechanism in the form of a novel rotary boring head structure for forming bores in a mine vein. Yet another object is to provide an improved feeding means whereby the boring machine may enter the bore hole formed thereby and be fed into the hole as boring progresses by propelling devices engaging and moving along the hole walls. A further object is to provide an improved carriage or launching device for the boring machine whereby the latter may be readily transported from place to place and adequately supported and guided during the initial penetrating movement of the boring machine into the mine vein or other earth formation. A still further object is to provide improved means associated with the propelling devices of the machine for tilting the machine body slightly relative to such device to alter the course of the boring head during the boring operation. Still another object is to provide an improved shaft or tunnel boring apparatus having novel combinations and arrangements of parts. These and other objects and advantages of the invention will, however, hereinafter more fully appear.

In the accompanying drawings there are shown for purposes of illustration one form and a modification which the invention may assume in practice.

In these drawings:

Figs. 1 and 1a, taken together, constitute a side elevational view of the improved boring machine and its transport and guide carriage.

Fig. 2 is a plan view of the apparatus shown in Fig. 1.

Fig. 3 is a cross sectional view taken on line 3—3 of Fig. 1, illustrating a portion of the drive mechanism for the shaker belt conveyor.

Fig. 4 is a cross sectional view taken in the planes of line 4—4 of Fig. 2, showing the mounting for the boring machine in the launching carriage.

Fig. 5 is a view in central longitudinal vertical section taken on line 5—5 of Fig. 2.

Fig. 6 is a detail vertical section taken on line 6—6 of Fig. 5.

Fig. 7 is a fragmentary vertical section illustrating details of the drive for the conveying means.

Fig. 8 is a fragmentary vertical section taken on line

8—8 of Fig. 3, showing a portion of the control for the shaker belt drive.

Fig. 9 is a detail section showing the novel expansible anchor for holding the cables and hose lines in the key-slot in the bore wall.

Fig. 10 is a detail view, with parts in horizontal section, illustrating the pivotal mounting structure for the key slot mechanism and showing the machine-key riding in the slot.

Fig. 11 is a diagrammatic view illustrating the hydraulic fluid system.

Fig. 12 is a somewhat schematic view showing the apparatus in an operating position in a mine with the boring machine in its launching position.

Fig. 13 is a view similar to Fig. 12, showing the boring machine in its launched position out of the carriage and within the bore in the mine vein.

Fig. 14 is a schematic view showing the apparatus in a mine with the machine-guide of the carriage in elevated position to permit tilting of the machine between substantially horizontal tunnelling and upright shaft-boring positions.

Fig. 15 is a schematic view showing the boring machine in vertical shaft-driving position.

Fig. 16 is a cross section taken on line 16—16 of Fig. 13, showing the shaker belt resting on the bore-bottom.

Figure 17:
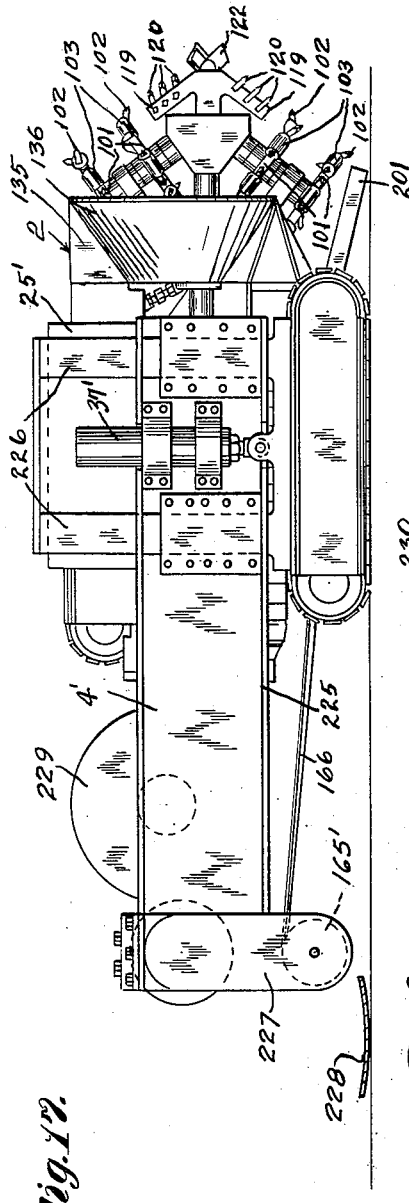
Figure 18:
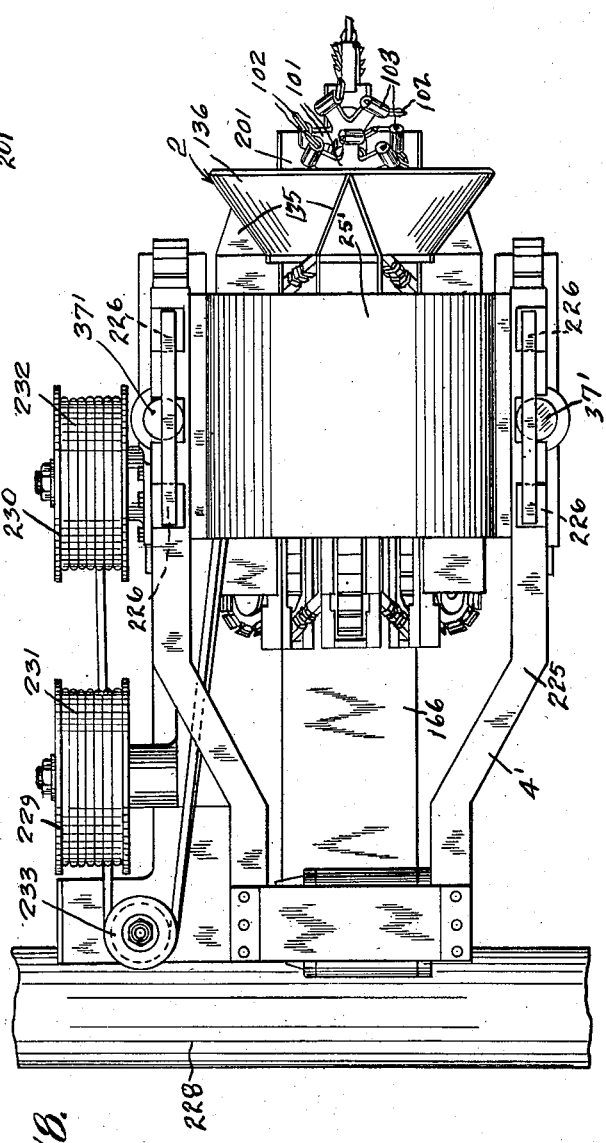

Figs. 17 and 18 are side elevational and plan views respectively, showing the boring machine mounted in a launching carriage of a modified construction.

In the illustrative embodiment of the invention shown in Figs. 1 to 15 inclusive of the drawings, a self-propelled launching carriage or truck is generally designated 1 and this carriage receives a unitary boring machine generally designated 2, and associated with and extending between the carriage 1 and the boring machine 2 is a conveying means generally designated 3 which may be of the kind known as a shaker belt generally similar to that disclosed in my copending application, Serial No. 20,252, filed April 10, 1948, now matured into Patent No. 2,713,414, dated July 19, 1955. Evidently, the boring machine may be associated with conveying means of other types.

The self-propelled launching carriage or truck 1 comprises a frame 4 adjustably mounted on side frames 5 of propelling and steering devices herein desirably in the form of endless crawler treads 6. The side frames 5 have usual guideways 7 along which endless tread chains 8 are guided for orbital circulation, and the tread chains are driven by individual motors 9 (Figs. 1 and 4) enclosed within the tread side frames. The motors 9 drive the tread chains in the manner of the tread drives of the boring machine as later described, and the motors are desirably reversible and may be independently controlled to effect drive of the crawler treads in either of opposite directions and to drive one tread at a speed different from the speed of the other to effect steering of the carriage, in a well-known manner. The carriage frame 4 includes an upstanding supporting and guiding frame 25 of generally circular cross section, as shown in Fig. 4, and fitted within this annular frame is a shell 26 providing an internal cylindrical bore or guiding surface 27 for receiving the bore machine 2 in a manner to be later described.

In this improved construction the circular frame or annulus 25 is secured at its sides, as by screws 28, to circular bearing plates 29 having peripheral grooves providing raceways 30 for ball bearings 31, the latter being guided in internal raceways 32 on annular bearing supports 33 carried by vertical guide blocks or slides 34. The guide blocks are mounted for vertical adjustment along vertical guideways 35 provided by upstanding frames or brackets 36 mounted at the tops of the side frames 5 of the carriage, as shown in Fig. 4. Carried at the upper portion of the brackets 36 are vertical fluid cylinders 37 containing reciprocable pistons 38 having piston rods 39 extending downwardly through the packed bottom heads 40 of the cylinders. These piston rods are pivotally connected at their lower ends at 41 to transverse pivot portions or trunnions 42 projecting outwardly from the sides of the vertical guide blocks 34. By properly supplying fluid under pressure to the vertical cylinders 37, the pistons 38 may be moved to effect raising or lowering of the annular guide frame 25 of the carriage with respect to the crawler treads 6 to vary the launching height, and by trapping fluid in the cylinders the annular frame 25 may be locked in adjusted position. The carriage guide frame 25 may be rocked in vertical planes on its bearing mountings by means of reversible fluid motors 45 (Fig. 4) mounted at the inner sides of the frame 25 and driving spur pinions 46 meshing with internal gears 47 integral with the adjacent bearing annuli or supports 33, as shown in Fig. 4. Thus, by properly operating the motors 45 the annular guide frame 25 may be tilted in vertical planes between a substantially horizontal position and a vertical position for a purpose to be later described, and by trapping fluid or otherwise locking the motors 45 the annular guide frame may be firmly held in adjusted position. Under certain conditions the motors 45 may be operated to swing the boring head to effect a swinging cut.

Now referring to detail structure of the boring machine 2, it will be noted that a central circular frame or body 50 (Figs. 4 and 5) comprises a housing 51 of a motor 52, and a front gear housing 53 secured to the motor-housing, and disposed generally radially of this central frame or body are longitudinally extending guide frames 54 for endless crawler treads 55. These tread frames are desirably spaced 120° apart with the upper crawler tread disposed at the vertical top center of the machine and with the bottom treads spaced 120° apart, 60° at each side of the vertical center, providing an open space for the conveying means 3 with the lower treads straddling the conveying means, as later explained. The tread frames 54 have inner frame portions 56 which are pivotally connected near their opposite ends at 57 to forwardly and inwardly inclined toggle links or arms 58, with the front arms arranged parallel to the rear arms. The arms 58 are pivotally supported at 59 on forward and rearward projections 60 and 61 of the central frame 50 of the machine. These tread frames provide guideways 62 along which endless tread chains 63 are guided for orbital circulation, and the tread chains are driven by motors 64 (Figs. 4 and 5), desirably electric motors, enclosed within the tread frames. Fixed to each motor shaft 65 is a spur pinion 66 meshing with and driving a spur gear 67. Arranged coaxial with and driven by the gear 67 is a shaft carrying a spur gear 68 meshing with and driving a spur gear 69 fixed to a longitudinal worm shaft 70 carrying a worm 71 meshing with and driving a worm wheel 72 in turn fixed to a transverse shaft 73. The shaft 73 is suitably journaled within a tread frame and has fixed thereto a spur gear 79 which drives an intermediate spur gear 80 in turn meshing with and driving a spur gear 81 secured to a parallel transverse shaft 82 likewise suitably journaled within the tread frame. Secured to the shaft 82 is a usual drive sprocket which engages and drives the associated tread chain 63. The motors 64 are desirably reversible and may simultaneously effect drive of the crawler treads and in either of opposite directions, in a well-known manner.

The rear portion 61 of the central frame 50 of the machine has a longitudinal cylinder bore 85 formed therein which contains a reciprocable piston 86 having its piston rod 87 secured to a rear spool or grooved collar 88 in the inner ends of the toggle arms 58 as shaped to engage in the collar-groove. Thus, when fluid under pressure is supplied to the cylinder bore the piston may be moved rearwardly to effect swinging of the toggle arms 58 to expand the crawler treads radially outwardly into engagement with the inner cylindrical surface 27 of the guide frame liner 26 or into contact with the walls of the bore formed in the earth formation by the machine as later explained. By trapping fluid in the bore 85 at opposite sides of the piston the crawler treads may be held in outward expanded position, and by venting the bore the treads may collapse inwardly.

The toggle arms 58 are desirably adjustable in length and, in this instance, each comprise a central adjustable portion 89 such as a turnbuckle having oppositely threaded portions threadedly engaged within the end portions of the arms, and these turnbuckle portions when suitably rotated may vary the distance apart of the arm pivots 57 and 59 thereby to effect tilting of the machine frame relative to the crawler treads slightly to alter the course of the machine during the boring operation.

The boring machine has a cone-shaped rotary boring head generally designated 90 comprising a rotary head frame 91 having its hub portion 92 formed integral with a longitudinally extending centrally located tubular shaft 93 journaled in bearings 94 suitably supported within the forward frame portion 60 of the machine frame. The head frame 91 comprises diverging arms 95 extending outwardly and inclined forwardly from the hub portion 92, and these arms carry bearings 96 in which the outer portions of relatively inclined shafts 97 are journaled, these shafts inclined outwardly and rearwardly from the frame hub 92. The inner portions of these inclined shafts 97 are journaled in bearings 98 supported in bearing supports 99 secured to a forward housing 100 integral with the forward portion of the head frame. Secured to these inclined shafts 97 at the opposite sides of the arms 95, as shown in Fig. 5, are rotary cutters or cutter wheels 101 arranged in a novel manner and which carry detachable cutter teeth 102. These teeth are provided with opposite cutting points and are reversible in sockets formed in lugs 103, and held in position in the lug sockets by usual set screws.

Now referring to the drive for the boring head, it will be noted that the motor 52 has a spur pinion 105 secured to its power shaft 106, and this pinion meshes with and drives a spur gear 107 secured to a longitudinally extending horizontal shaft 108 suitably journaled within the gear housing 53. Rotatable with the gear 107 is a spur gear 109 meshing with and driving a spur gear 110 keyed to the rear end of a longitudinal shaft 111 journaled in bearings 112 and 113 supported respectively within the rear end of the tubular shaft 93 and the forward portion of the cutter frame hub 92. The shaft 111 extends axially through the shaft 93 (Fig. 5) and the hub of the head-frame and has keyed to its forward portion a bevel gear 114 meshing with and driving bevel gears 115 keyed to the inner ends of the relatively inclined shafts 97 which support and drive the cutter wheels 101. A front plate 116 is secured to the gear housing 100 and provides a front closure for the housing chamber and supported within this plate is a bearing 117 for the forward portion of the shaft 111. The forward portion of the shaft 111 extends forwardly through an opening in the plate 116 and supports and is fixed to a rotary cutter 118 having outwardly and rearwardly inclined, diverging arms 119 extending in the position shown substantially parallel with the shafts 97 and which carry cutter teeth 120 similar to the teeth above described. The front rotary cutter 118 has a forwardly opening axial socket 121 which receives the shank of a detachable small pilot bit or cutter 122. Also secured to the shaft 108 is a spur pinion 123, which meshes with and drives a spur gear 124 (Fig. 6) secured to a longitudinal shaft 125 arranged parallel with the shaft 108 and likewise suitably journaled within the gearing housing 53. Meshing with the gear 124 is a spur gear 126 which is secured to a parallel shaft 127 likewise journaled within the gear housing 53 and rotatable with this shaft 127 is a spur gear 128 meshing with and driving a spur gear 129 secured to a parallel shaft 130 likewise suitably journaled within the gear housing 53. Meshing with and driven by the gear 129 is spur gear 131 meshing with a spur gear 132 and driven by this latter gear is a spur pinion 133 meshing with and driving a large spur gear 134 having its hub keyed to the rear end of the shaft 93 which is secured to the head-frame. Thus, during running of the motor 52, the head-frame may be rotated about the axis of the shaft 93 and the cutter wheels 101 simultaneously rotated about the axes of the inclined shafts 97. The rotary cutter 118 and the pilot cutter 122 rotate in an opposite direction and at a speed higher than the rate of rotation of the head-frame 91 while the cutter wheels 101 rotate about their own axes at a speed quite like that of the rotary cutter 118, and as the cutter wheels revolve about their own axes they concurrently turn about the head axis with the head frame. The cutter wheels, as the head revolves, cut along annular paths in the mine vein or earth formation, and as the head advances the wheel cutters effectively cut away the material, so that the material is effectively dislodged and disintegrated. By rotating the forward cutters in a direction opposite to the direction of rotation of the head frame, the cutting forces of one tend to substantially offset, or counterbalance, those of the other. As the result of such an arrangement of the cutters of the boring head, the coal or other material being bored is effectively and rapidly dislodged and disintegrated. Carried at the forward ends of the crawler tread frames 54 are forwardly tapering supports or wedge shaped frame members 135 to which a cone-shaped or funnel-like forwardly flared deflector plate 136 is secured, and this deflector plate extends outwardly with its peripheral edge lying close to the bore walls and is cut away or open at 137 at its bottom to clear the sides of the conveyor of the conveying means 3, later described. This deflector plate serves to direct the disintegrated material rearwardly from the boring head within the machine where it may discharge downwardly onto the conveyor.

Mounted in a suitable location on the central machine frame or body 50 is a slot-cutting mechanism, generally designated 140 (see Figs. 4 and 10), comprising a motor 141 pivotally mounted at 142 on brackets 143 secured to the machine frame 50, to swing in horizontal planes. Mounted on the motor housing to swing horizontally with the motor is a gear housing 144 on which a rotary cutter herein desirably a cutter wheel 145 is journaled for rotation about a vertical axis. Secured to the motor shaft is a worm 146 meshing with a worm wheel 147 keyed to the upper end of a vertical shaft 148 suitably journaled in bearings supported within the gear housing 144. The rotary cutter wheel is carried at the lower end of the vertical shaft 148 in the manner shown in Fig. 4. A horizontal fluid cylinder 149 is pivotally mounted at 150 on the adjacent side of the machine frame 50 to swing in horizontal planes and reciprocable in this cylinder is a piston 151 having its piston rod pivotally connected to the adjacent side of the gear housing 144. During operation of the boring machine, fluid under pressure supplied to the cylinder 149 may move the piston outwardly to project the cutter wheel 145 laterally from the outer side of the machine, as shown in Fig. 10, so that as the boring machine advances a key-slot or groove 152 is cut in the bore-walls nearly at the horizontal center of the machine. Secured to the adjacent side of the machine is a projection in the form of a key 153 which enters and rides in the key-slot 152 as the machine advances and this key serves to hold the machine against bodily rotation within the bore. As shown in Figs. 1 and 13, power conductor cables and water lines 154 and 155 lead to the boring machine for supplying power medium to the motors 52, 64 and 141 and to supply water under pressure to the spray devices on the machine for allaying the dust created by the boring head, and these cables and water lines are directed into the key slot 152 as the boring machine is advanced and are moved out of the slot as the machine is retracted in the bore.

Anchor devices 156, shown in Fig. 9, comprising expansible gripping elements 157 and 158 adjusted by a screw 159 may be placed at intervals within the key slot 152 and are adjustable into engagement with the top and bottom slot-walls to hold the power cables and water lines in position within the key slot. These anchor devices may be readily removed as the machine is retracted in the bore.

The key 153 is adjustably secured to the machine frame by bolts 160 which pass through transverse slots 161 in a support 162 on the machine frame, and at times the key may be retracted within the lateral limits of the machine, as for example, prior to entry of the machine into its launching carriage. In Fig. 10 the conductors 154 and 155 are shown clamped at 163 to the machine frame and are so arranged as to be dragged into the key slot 152 as the machine advances.

Now referring to the conveying means 3, it will be noted that carried by the launching carriage 1 on the rearward portion 164 of the carriage frame 4 is a winding drum 165 (Figs. 3 and 5) on which a flexible shaker belt 166 is wound. As mentioned above, this shaker belt conveyor may be similar to that disclosed in my copending application, Serial No. 20,252 and comprises a horizontal shaft 167 journaled in bearings supported by a frame 168 secured to the carriage frame. The drum 165 is journaled on bearings supported by the shaft 167, and the latter is driven by a motor 168', desirably an electric motor, carried by the carriage frame (Fig. 7), and this motor drives a sprocket 169 connected by an endless drive chain 170 to a sprocket 171 keyed to the shaft 167 (Fig. 3). Formed on the shaft 167 is a spur pinion 172 meshing with planet gears 173 journaled on stub shafts 174 integral with the drum frame. These planet gears mesh with an internal gear 175 formed on a rotatable reaction member 176 journaled on a bearing supported by the drum shaft. Cooperating with this reaction member is a brake band 177 operated by a lever 178 (Fig. 8) pivotally mounted at 179 on the adjacent end of the frame 168. Keyed to the shaft 167 is a spur gear 180 meshing with a spur gear 181 which in turn meshes with and drives a spur gear 182 secured to a transverse shaft 183 suitably journaled on the frame 168. Secured to this shaft is a cam 184 which engages the lever 178 to swing the latter back and forth about its pivot to effect intermittent application and release of the brakeband 177. Thus, as the drum shaft 167 is driven the drum is intermittently driven in a direction tending to wind in the shaker belt on the drum. The forward end of the shaker belt is attached as by one or more hooks 185 to the front edge of a reciprocable frame 186 guided on the machine frame at 187 and providing an element of a reactor mechanism to be now described. The reciprocable reactor frame 186 has front and rear abutment lugs 188 which slide along parallel guide rods 189 secured at 190 to the frame and supported thereby. Arranged between collars 191 secured to the rods and the front abutment lugs 188 and encircling the rods are coil springs 192. As the shaker belt is wound in by the drum 165, the reactor frame 186 is slid rearwardly thereby compressing the coil springs 189 and when the drum 165 is disconnected from its drive, the coil springs move the conveyor belt forwardly. As a result of this mechanism, the shaker belt is reciprocated at a relatively low speed in the conveying direction and at relatively high speed in the opposite direction so that the disintegrated material received by the shaker belt is conveyed rearwardly of the machine. When the material on the shaker belt reaches the drum 165, it is deflected by a deflector plate 193 or otherwise onto an endless chain type discharge conveyor 194 which is guided for circulation along an upwardly and rearwardly inclined conveyor frame 195 mounted on the rearward portion 164 of the carriage frame (see Fig. 1a). This chain conveyor is driven by the motor 168' and the conveyor drive comprises a spur gear 196 (Fig. 7) meshing with and driven by a spur gear 197 (Fig. 3) keyed to the drum shaft 167. The gear 196 meshes with and drives a spur gear 198 secured to a transverse shaft 199 which is connected in driving relation with the chain conveyor 194 in a well-known manner. From the foregoing, it is evident that as the boring head operates to dislodge and disintegrate the mineral of the mine vein, the disintegrated mineral is discharged onto the shaker conveyor belt, is conveyed rearwardly of the machine by the shaker belt and is discharged onto the chain conveyor of the launching carriage which is located outside of the bore formed by the boring machine in the entry (as shown in Fig. 13). The rear discharge conveyor 194 may discharge the disintegrated material onto the conventional mine haulage system such as onto a shaker belt conveyor or into haulage cars likewise in a well-known manner.

As the boring machine advances in the bore, a reciprocable front nose piece 201 rides on the bore-bottom and directs the loose mineral from the bottom of the bore rearwardly and upwardly toward the front receiving end of the shaker belt, and this nose piece is desirably pivoted at 202 on the reciprocable reactor frame 186 to tilt in vertical planes. The forward portion of this nose piece is desirably curved to conform to the curvature of the curved bottom of the bore, and a rearward portion 203 extends rearwardly above the front receiving end of the shaker belt so that the loose material is directed onto the belt during its reciprocation, in the manner shown in Fig. 5. The flexible shaker belt 166 has its portion intermediate the boring machine and the launching carriage resting on the bore bottom and the belt due to its flexibility conforms substantially to the curvature of the bore (see Fig. 16) so that the sides of the belt curve upwardly, thus providing a troughlike shape which retains the loose material on the belt as it is conveyed rearwardly from the machine through the bore.

The hydraulic fluid system, shown in Fig. 11, will now be described. A pump 205, which may be mounted in the gear housing 53 of the machine and be driven by the shaft for gear 132 has its suction side connected by the conduit 206 to a fluid tank 207 which may comprise the gear housing chamber and which may contain any suitable hydraulic fluid such as a light oil. The discharge side of the pump is connected by conduit 208 to the pressure passage of a valve box 209 of a conventional control valve mechanism suitably mounted on the machine. Under suitable conditions, the control valve mechanism may be mounted on the launching carriage remote from the machine. The discharge passage of the valve box is connected by a return conduit 210 back to the tank 207. The valve box has parallel bores containing conventional control valves 211, 212, 213 and 214 each having a suitable operating handle. The bore containing the control valve 211 is connected by conduits 215 and 216 to the opposite ends of the bore 85 at opposite sides of the piston 86. The bore containing the control valve 212 is connected by branched conduits 217 and 218 to the opposite sides of the reversible fluid motors 45, while the bore containing the control valve 213 is connected by conduits 219 and 220 to the opposite ends of the swing cylinder 149 for the slot-cutter. The bore containing the control valve 214 is connected by branched conduits 221 and 222 to the opposite ends of the vertical fluid cylinders 37 for elevating the annular carriage frame 25. In the event the control valve mechanism 209 is mounted on the launching carriage, the conduits 215 to 222 inclusive must extend flexibly between the launching carriage and the boring machine and may also be received in the recess provided by the key-slot 152.

In the modification shown in Figs. 17 and 18, the boring machine 2 above described is mounted in a launching carriage or truck 225 which omits the swivel or tilting mounting for the annular guide frame 25' providing the machine-receiving bore. In this instance, the annular frame 25' is guided for vertical adjustment along vertical guides 226 and the fluid cylinders 37' serve to raise the frame 25' vertically relative to the carriage frame 4' to vary the elevation of the boring machine with respect to the mine floor. Thus, the boring machine may be launched from the carriage into the bore in the mine vein or earth formation at different elevations. The shaker drum 165' of the shaker belt conveyor is mounted on the depending rearward portion 227 of the frame of the launching carriage and the shaker belt 166 wound on this drum conveys the disintegrated material discharged from the boring head rearwardly from the machine and through the bore to the rear end of the launching carriage, and the shaker belt at its rear end discharges on a similar shaker belt 228 laid on the mine floor and arranged at right angles to the belt 166. Mounted at the side of the carriage frame are conventional reels 229 and 230 on which a power conductor cable 231 and a water line 232 are respectively wound, and coaxial guide sheaves 233 journaled at the rear end of the carriage frame rearwardly of the rear reel 229, serve to guide the cable and water line respectively as they extend from the reels to the machine.

The general mode of operation of the improved boring machine is as follows: The boring machine 2 may be transported from place to place about the mine by the self-propelled launching carriage 1, and when the working place is reached the launching frame 25 of the carriage may be elevated and tilted to direct the boring machine from the carriage in the desired direction. Usually the boring head is launched toward the face just above the mine floor, as shown in Fig. 12, and as the machine travels forwardly to form the bore in which it is received, it may move downwardly at a slight inclination to bring the head down to the floor level. The crawler treads 55 of the boring machine engage the inner walls 27 of the frame-liner 26 of the annular guide frame 25, to feed the boring machine forwardly from the launching carriage to start the bore in the mine vein or other earth formation and as the bore in the vein or other earth formation deepens sufficiently the crawler treads engage the bore-walls, as shown in Fig. 13, to effect feed. During horizontal boring the fluid piston 86 controlled by the valve 211, may effect swinging of the toggle arms to hold the crawler tread devices firmly against the bore-walls. By adjusting the effective lengths of the toggle arms 58, the machine frame and boring head may be tilted slightly with respect to the crawler treads to alter the course of the machine as the bore is advanced. The rearward reaction forces set up by the boring head during the boring operation may tend to move the machine frame rearwardly to cause the toggle arms to firmly hold the crawler treads in feeding contact with the bore-walls and this is particularly true during the boring of an upwardly inclined or vertical shaft, as shown in Fig. 15, wherein the boring machine climbs upwardly along the inclined or vertical hole walls as the hole deepens. In order to effect vertical or inclined launching of the boring machine, the rearward frame portion 164 and the conveyor mechanism carried thereby are detached from the annular guide frame 25 and the cylinders 37 are operated to elevate the annular guide frame and the latter may then be swung by the motors 45 on its swiveled mounting to bring the same into the desired angular position. Under low headroom, as shown in Fig. 15, the boring head, as the frame is swung from horizontal to vertical position, may cut into the roof slightly as indicated at C to permit the machine to assume its vertical position, and then the boring machine may be fed upwardly by its crawler treads from the guide frame of the launching carriage into the bore hole. During angular or vertical boring, the disintegrated material may be discharged from the machine by gravity and any conventional form of conveying means such as a shaker belt conveyor may be suspended from guides from the roof or otherwise supported to receive the disintegrated material discharged from the bore hole, or if desired the material may be discharged by gravity downwardly from the bore hole directly onto the mine floor and thereafter be loaded out in a suitable manner. During the operation of the machine while effecting the formation of a substantially horizontal bore, the launching carriage may remain in the main entry or other mine passageway and the shaker belt 166 may be extended from its winding drum by the advance of the boring machine and as the machine advances, the disintegrated material discharged from the boring head is continuously conveyed from the machine rearwardly through the bore to discharge on another conveyor or other conventional means of transportation located in the main entry or other mine passageway. The power and water lines connected to the machine follow the machine into the bore and the key slot provided by the machine and in which the machine is keyed receives such power and water lines as the machine advances. When the machine is advanced the desired distance in the mine vein or other earth formation, the crawler treads may be reversed and the machine may be retracted in the bore, and the power and water lines move out of the key slot as the machine retreats. The curved walls of the bore provided by the machine substantially eliminate any need for roof props, roof anchors or other roof supporting means. The machine operator may ride in a prone position on a platform P arranged longitudinally within the machine at one side of the machine frame and the operator while substantially protected may readily control the functions of the machine and observe the operating characteristics of the boring head. In case a bit change or other adjustments are necessary at the front of the machine the latter may be retracted a short distance in the bore and the operator or his helper may crawl forwardly past the head into a position in advance of the head so that bit changes or other adjustments may be conveniently effected. Under conditions where the operator cannot ride on the machine as for example during vertical shaft boring, the machine controls may be located in the main entry on the launching carriage or on a separate truck. Other modes of use and advantages of the machine will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. In combination, a body, a mining mechanism carried by said body for removing material from an earth formation, and means for feeding said mining mechanism toward the work as mining progresses comprising endless crawler tread devices by which said body is supported and movable outwardly relative to said body into engagement with the walls of an opening in the earth formation in which said body is received and moves, and means responsive to the reaction forces set up by the mining mechanism during the mining operation for automatically variably urging said tread devices outwardly relative to said body into firm contact with the walls of the opening as said mining mechanism is fed forwardly.

2. In combination, a body, a mining mechanism carried by said body for forming an opening in an earth formation for receiving said body as mining progresses, and means for feeding said mining mechanism comprising endless crawler tread devices extending longitudinally of said body and by which the latter is supported, said tread devices engaging the walls of said opening at points spaced about said opening, and means responsive to the rearward reaction forces set up by the mining mechanism during the mining operation for automatically variably yieldingly urging said tread devices relative to said body into contact with the walls of the opening as said mining mechanism is fed forwardly.

3. In combination, a body, a mining mechanism carried by said body for forming an opening in an earth formation for receiving said body as mining progresses, and means for feeding said mining mechanism comprising endless crawler tread devices extending longitudinally of said body and on which the latter is adjustably mounted, said tread devices engaging the walls of said openings at points spaced about said opening, and means for constantly urging said tread devices outwardly relative to said body into firm contact with the walls of the opening as said mining mechanism is fed forwardly, said constantly urging means including adjustable devices connected between said body and said tread devices and adjustable for slightly tilting said body relative to said tread devices while the latter remain in contact with the walls of the opening to alter the course of said mining mechanism.

4. In combination, a body, a rotary boring and disintegrating mechanism for forming a bore of circular cross section in an earth formation, and supporting and propelling means for said boring and disintegrating mechanism for advancing the latter as boring progresses comprising crawler tread devices engaging the bore-walls at points spaced equally about the bore, and supporting connections between said body and said crawler tread devices and actuated by the axial rearward thrust of said boring and disintegrating mechanism during the boring operation for urging said tread devices into firm engagement with the bore-walls.

5. A combination as set forth in claim 4 wherein said supporting connections are adjustable in length for tilting said body relative to said tread devices to vary the angular position of said boring and disintegrating mechanism to alter the course of the latter.

6. In combination, a body movable in a bore formed in a mine vein, a mining mechanism carried by said body, crawler tread devices engaging and movable longitudinally along the walls of said bore for feeding said mining mechanism, and supporting connections between said body and said crawler tread devices for holding the latter outwardly relative to said body in firm contact with the bore-walls, said body movable axially rearwardly relative to said tread devices for holding the latter through said supporting connections into contact with the bore-walls.

7. In combination, a body, a mining mechanism carried by said body for forming an opening in an earth formation, crawler tread devices engaging the walls of said opening at points spaced about said opening for feeding said mining mechanism toward the work, and adjustable supporting connections between said body and said crawler tread devices responsive to axial movement of said body relative to said tread devices caused by the rearward reaction of said mining mechanism during the hole-forming operation to impart a rearward thrust to said supporting connections to effect holding of said crawler tread devices outwardly firmly against the walls of said opening.

8. The combination as set forth in claim 7 wherein said supporting connections are adjustable in length to effect slight tilting of said body relative to said crawler tread devices to alter the angular position of said mining mechanism.

9. A rotary boring machine comprising, in combination, a body, a rotary boring head carried by said body for forming a bore of circular cross section in an earth formation, endless crawler tread devices engaging the walls of the bore for feeding said head as boring progresses, and supporting connections between said body and said crawler tread devices for holding the latter outwardly in contact with the bore-walls, said supporting connections actuated by axial movement of said body relative to said tread devices for effecting holding of said tread devices outwardly as aforesaid.

10. A boring machine as set forth in claim 9 wherein said crawler tread devices are spaced 120° apart circumferentially about said bore.

11. A rotary boring machine comprising, in combination, a body, a rotary boring head carried by said body for forming a bore of circular cross section in an earth formation, endless crawler tread devices engaging the walls of the bore for feeding said head as boring progresses, and supporting connections between said body and said crawler tread devices for holding the latter outwardly in contact with the bore-walls, said supporting connections comprising parallel toggle links pivotally connected to said body and to each of said crawler tread devices and swingable outwardly about their pivots relative to said body to hold said tread devices into firm contact with the bore-walls.

12. A boring machine as set forth in claim 11 wherein said parallel toggle links are each adjustable in length whereby said body may be tilted slightly with respect to said tread devices.

13. A boring machine as set forth in claim 11 wherein a power device is mounted on said body for swinging said toggle links outwardly about their pivotal connections with said body for holding said crawler tread devices firmly against the bore-walls.

14. A boring machine comprising a body movable in a bore formed in an earth formation, a mining mechanism carried by said body, motor driven propelling devices engaging the walls of said bore for feeding said mining mechanism and adjustable inwardly and outwardly relative to said body, and means actuated by rearward axial movement of said body relative to said propelling devices for constantly holding said propelling devices outwardly firmly in contact with the bore walls during the mining operation.

15. In combination, a rotary mining mechanism for forming a bore in the mineral of a solid mine vein, traction devices engaging the bore-walls for advancing said mechanism during the boring operation, and connections between said mechanism and said traction devices and actuated by axial movement of said mechanism with respect to said traction devices, said connections urging said traction devices outwardly into firm contact with the bore-walls, the rearwardly reacting forces created by said mechanism during the boring operation causing said connections to urge said traction devices outwardly into contact with the bore-walls as aforesaid.

16. A combination as set forth in claim 15 wherein said connections are relatively adjustable to effect tilting of said mining mechanism with respect to said traction devices to vary the course of said rotary mining mechanism.

17. A combination as set forth in claim 15 wherein said connections are in the form of links which are inclined rearwardly and outwardly, said links having pivotal connection with said mining mechanism and swingable toward positions perpendicular to the bore axis upon rearward axial movement relative to said traction devices.

18. A combination as set forth in claim 17 wherein said links are adjustable in length to effect tilting of said rotary mining mechanism relative to said traction devices to vary the course of said mining mechanism.

19. A combination as set forth in claim 15 wherein motor means is provided on said rotary mining mechanism for actuating said connections to urge said traction devices outwardly into firm contact with the bore-walls.

20. In combination, a carriage having supporting and propelling means, a guide frame swivelly mounted on said carriage to tilt in vertical planes relative thereto, means for elevating said swivel mounting means relative to said carriage, a rotary mining mechanism for forming a bore in the mineral of a solid mine vein and guided on said guide frame for axial movement relative thereto, and means for moving said mining mechanism axially relative to said guide frame into the bore in the mine vein.

21. In combination, a mobile carriage, guiding means on said carriage, a rotary mining mechanism for forming a bore in the mineral of a solid mine vein and mounted on said carriage for movement back and forth relative to said guiding means, mechanism for adjustably mounting said guiding means to vary the position thereof in vertical planes relative to said carriage, and means for moving said mining mechanism axially along said guiding means into the bore in the mine vein.

22. A combination as set forth in claim 21 wherein said adjustable mounting mechanism includes means for tilting said guiding means in vertical planes about a horizontal transverse axis relative to said carriage.

23. A combination as set forth in claim 21 wherein said guiding means comprises an annular frame having a bore in which said rotary mining mechanism is arranged, and said moving means includes moving devices engaging the walls of said last mentioned bore.

24. A combination as set forth in claim 22 wherein said adjustable mounting means includes a fluid cylinder for varying the elevation of said guiding means relative to said carriage and a fluid cylinder is provided for actuating said moving devices for holding the same in engagement with the bore-walls and means is provided for supplying fluid under pressure for said fluid cylinders.

25. In combination, a mining mechanism movable in a bore, traction devices engaging the walls of the bore for advancing said mechanism during its operation, and connections between said mechanism and said traction devices and actuated by axial movement of said mechanism with respect to said traction devices, said connections urging said traction devices outwardly into firm engagement with the bore-walls, the rearwardly reacting forces created by said mechanism during its operation causing said connections to urge said traction devices outwardly into contact with the bore-walls as aforesaid.

26. A combination as set forth in claim 25 wherein said connections are in the form of links which are inclined rearwardly and outwardly, said links having pivotal connection with said mining mechanism and swingable toward positions perpendicular to the bore-axis upon rearward axial movement relative to said traction devices.

27. A combination as set forth in claim 25 wherein said connections are adjustable to effect tilting of said mining mechanism relative to said traction devices to vary the course of said mining mechanism.

28. A combination as set forth in claim 25 wherein said bore is provided by guiding means which are adjustable to vary the angular position of said bore to change the direction in which said mining mechanism operates.

29. In combination, a mining mechanism movable in a bore, continuously moving traction devices engaging the walls of the bore for advancing said mechanism in the bore during its operation, and means operatively associated with said traction devices and said mining mechanism for varying the tractive effort exerted by said traction devices in accordance with varying loads on said mining mechanism.

30. In combination, a mining mechanism movable in a bore, traction devices engaging the walls of the bore for advancing said mechanism in the bore during its operation, means for urging said traction devices outwardly into firm engagement with the bore-walls, and associated means automatically responsive to the varying thrust loads on the mining mechanism for varying the tractive effort exerted by said traction devices in accordance with varying loads encountered by the mining mechanism during its operation.

31. In combination, a boring mechanism for forming a bore in an earth formation, traction means engaging the walls of the bore for advancing said mechanism in the bore during its operation, and means operatively associated with said traction means and said mining mechanism for varying the tractive effort exerted by said traction means automatically in accordance with the thrust loads on said mining mechanism.

32. A combination as set forth in claim 31 wherein said means for varying the tractive effort embodies means for tilting said boring mechanism relative to said traction means while the latter remains in contact with the walls of the bore to alter the course of said boring mechanism.

33. A launching carriage for a unitary mining mechanism of the kind adapted to form a bore in the earth formation and comprising a mobile base, guiding means carried by said base for receiving said unitary mining mechanism for transporting the latter from place to place about the mine and for guiding said mining mechanism during launching thereof from said guiding means, and mechanism for adjustably mounting said guiding means on said base to vary the position thereof with respect thereto to enable launching of said mining mechanism in different directions with respect to said base, said mining mechanism movable from said guiding means into the bore in the earth formation.

34. In combination, a launching carriage comprising a mobile base, a guiding frame mounted on said base and providing a guiding bore, and a unitary boring machine for forming a bore in an earth formation and receivable in said guiding bore of said base frame during transport of said boring machine, said boring machine being movable from said guiding bore into the bore in the earth formation.

35. A launching carriage as set forth in claim 34 wherein said frame is mounted on said base to tilt in vertical planes whereby said boring machine may be launched into the bore in the earth formation at different angles from said carriage.

36. A launching carriage as set forth in claim 34 wherein said frame is adjustable in elevation with respect to said carriage, and elevating means is provided for said frame.

37. A boring apparatus comprising, in combination, a mobile carriage, a guide mounted on said carriage, a boring machine for forming a bore in the earth formation and carried by said guide, means for pivotally mounting said guide on said carriage, said boring machine being movable from said guide into the bore in the earth formation in the different angular positions of said guide, and power devices for swinging said guide in vertical planes on its pivotal mounting relative to said carriage.

38. In combination, a launching carriage having mobility providing means, guiding means extending longitudinally of said carriage, means for adjustably mounting said guiding means on said carriage for movement into different angular positions with respect thereto, a unitary mining mechanism for penetrating and dislodging the mineral of a solid mine vein, said mining mechanism receivable by said carriage and guided for movement along said guiding means and movable from said guiding means for support independently of said carriage, and means for adjusting the position of said guiding means on its mounting relative to said carriage to vary the direction of guided launching movement of said mining mechanism from said guiding means.

References Cited in the file of this patent

UNITED STATES PATENTS

| Re. 11,333 | Stanley | May 9, 1893 |
| 444,027 | Stephenson | Jan. 6, 1891 |
| 931,017 | Schutt | Aug. 10, 1909 |
| 1,001,903 | Temple | Aug. 29, 1911 |
| 1,073,271 | Merrill | Sept. 16, 1913 |
| 1,179,342 | Wittich | Apr. 11, 1916 |
| 1,201,097 | Proctor | Oct. 10, 1916 |
| 1,326,480 | Dana | Dec. 30, 1919 |

(Other references on following page)

UNITED STATES PATENTS

| | | |
|---|---|---|
| 1,378,811 | Holmes | May 17, 1921 |
| 1,388,545 | Bohan | Aug. 23, 1921 |
| 1,425,103 | Kuhn | Aug. 8, 1922 |
| 1,508,634 | Wilson | Sept. 16, 1924 |
| 1,532,243 | Hebsacker | Apr. 7, 1925 |
| 1,566,060 | Wright | Dec. 15, 1925 |
| 1,736,853 | Fisher | Nov. 26, 1929 |
| 1,871,186 | Lindgren | Aug. 9, 1932 |
| 2,118,490 | Challacombe | May 24, 1938 |
| 2,374,240 | Shankman | Apr. 24, 1945 |
| 2,548,952 | Crossland | Apr. 17, 1951 |
| 2,616,677 | Compton | Nov. 4, 1952 |
| 2,699,328 | Alspaugh | Jan. 11, 1955 |
| 2,740,618 | Snyder et al. | Apr. 3, 1956 |